United States Patent [19]

Steed

[11] 4,119,334
[45] Oct. 10, 1978

[54] SPINWELDED PLASTIC PIPE COUPLING JOINT

[75] Inventor: Michael Halsey Steed, East Palo Alto, Calif.

[73] Assignee: Fafco Incorporated, Menlo Park, Calif.

[21] Appl. No.: 812,135

[22] Filed: Jul. 1, 1977

[51] Int. Cl.² ............................................. F16L 21/00
[52] U.S. Cl. ..................................... 285/236; 285/423
[58] Field of Search ................ 285/236, 423, 291, 369

[56] References Cited

U.S. PATENT DOCUMENTS

| 2,261,948 | 11/1941 | Beach | 285/236 X |
| 2,933,428 | 4/1960 | Mueller | 285/423 X |
| 3,507,520 | 4/1970 | Guldener et al. | 285/423 X |
| 3,917,497 | 11/1975 | Stickler | 285/423 X |

FOREIGN PATENT DOCUMENTS

| 1,182,484 | 11/1964 | Fed. Rep. of Germany | 285/235 |
| 236,127 | 7/1925 | United Kingdom | 285/236 |
| 1,345,941 | 2/1974 | United Kingdom | 285/369 |

Primary Examiner—Thomas F. Callaghan

[57] ABSTRACT

A plastic ring is spun onto the end of a plastic pipe, the heat of friction fusing the contacting surfaces between the ring and the pipe, forming a weld therebetween upon cooling. The ring provides greater radial rigidity at the end of the pipe, and carries a flange extending beyond the outside diameter of the pipe. A flexible sleeve is slipped over the ends of two adjacent sections of such pipe with the flanges in abutting position. Band-type clamps surround the sleeve overlying the rings and are tightened to effect a seal between the sleeve and the periphery of the flanges. The end rings are spun onto the pipe ends with either the inside or the outside diameter of the pipe engaging the interfering surface on the ring in two different embodiments.

9 Claims, 6 Drawing Figures

U.S. Patent
Oct. 10, 1978
4,119,334
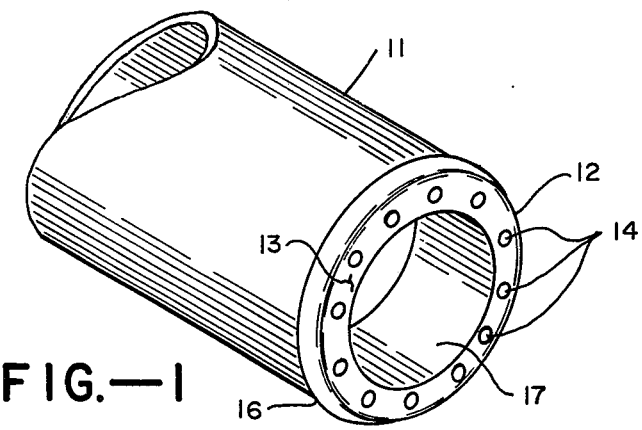
FIG.—1
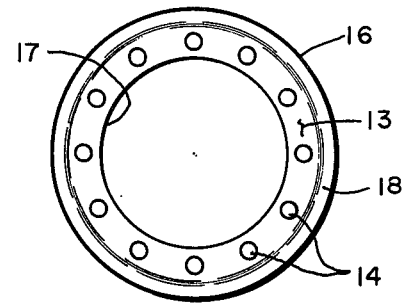
FIG.—2
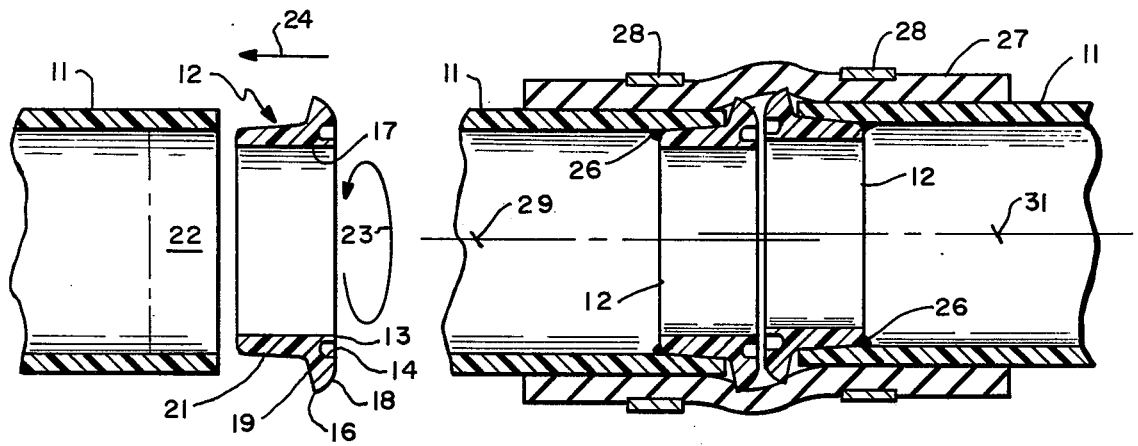
FIG.—3
FIG.—4
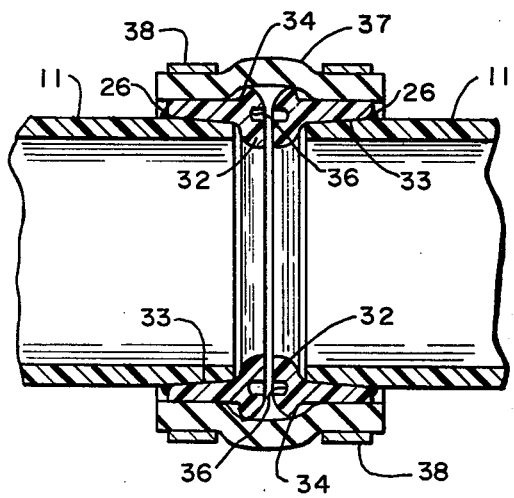
FIG.—5
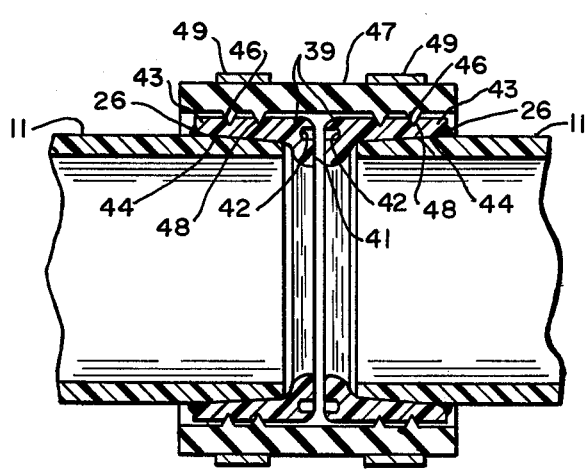
FIG.—6

4,119,334

SPINWELDED PLASTIC PIPE COUPLING JOINT

BACKGROUND OF THE INVENTION

This invention relates to a coupling joint for plastic pipe and more particularly to such a pipe joint for use in a plumbing circuit subjected to widely varying ambient temperature.

Spinwelding of plastic parts is well known wherein one part is spun against the surface of another at a surface differential speed such that the surfaces fuse and form a weld joint upon cooling. Examples may be seen in the insertion of a plastic plug in one end of a plastic conduit to form a holding tube. Another example is a butt welding process involving spinning of one edge of a cylindrical part against the edge of another similarly shaped part until the engaging circuits fuse from the friction induced heat and thereafter solidify to form a weld-like bond. In most plumbing systems, however, one length of pipe is coupled to another by placing a sleeve around the abutting ends of the pipes, and applying a bonding agent therebetween. As a consequence, a minimum of pipe misalignment is allowable, and once the joint has been set it cannot be separated without destruction of the joint. An entire section of pipe may have to be removed to remove such a joint, which necessitates replacement by a repair section of pipe, and a minimum of two joints in place of the one being removed. In the case of plastic pipe coupling joints which include a sleeve over abutting ends of plastic pipe, an external clamping pressure is necessary to hold the pipe sections together axially and to produce a pressure between the sleeve and the outside diameter of the pipe ends to obtain a joint seal. Over prolonged periods of time, when the pipe sections are subjected to considerable temperature excursions, the plastic in the pipe sections shows a marked tendency to creep and assume a smaller diameter as it yields to the clamping pressure, thereby allowing leakage between the joint sleeve and the outside surface of the pipe.

A plastic pipe coupling joint is needed which maintains its seal over prolonged periods of time and wide excursions of operating temperature, which provides a backup seal, and which may be disassembled and reassembled while allowing an appreciable degree of misalignment between the pipe axes.

SUMMARY AND OBJECTS OF THE INVENTION

Coupling structure for joining two lengths of plastic pipe includes a pair of plastic end rings each having a weld surface thereon which is formed to engage a surface on one of the pipe ends with an interference fit therebetween. When the weld surfaces on the end rings are spun onto the respective surfaces at the ends of the plastic pipes, the heat of friction causes the engaging surfaces to fuse, which forms a weld joint therebetween upon cooling. The end rings provide additional radial rigidity at the pipe ends. The plastic rings have a peripheral flange which extends beyond the outside diameter of the pipe ends. A flexible sleeve overlies the ends of the pipes with the flanges in juxtaposition, and means are provided which overly the flexible sleeve and the plastic end rings to provide a radially directed clamping pressure against the radial rigidity provided by the plastic end rings. A seal is obtained at the lines of contact between the periphery of the flanges and the inside of the flexible sleeve.

In general it is an object of the present invention to provide a plastic pipe coupling joint which maintains joint integrity over extended periods of time and wide ranges of operating temperature.

Another object of the present invention is to provide a plastic pipe coupling joint which includes structure resisting axial forces tending to separate the joint.

Another object of the present invention is to provide a plastic pipe coupling joint which is easily assembled and disassembled, without destruction of component parts.

Another object of the present invention is to provide a plastic pipe coupling joint which allows misalignment between the axes of adjacent pipe sections.

Additional objects and features of the invention will appear from the following description in which the preferred embodiment has been set forth in detail in conjunction with the accompanying drawings.

BRIEF DESCRIPTION OF THE DRAWINGS

FIG. 1 is an isometric view of a sub-assembly included in the disclosed invention.

FIG. 2 is a front elevational view of a plastic end ring used in the coupling joint.

FIG. 3 is a side sectional view of a pipe section and the plastic end ring.

FIG. 4 is a side sectional view of the plastic pipe coupling joint.

FIG. 5 is a side sectional view of an alternate embodiment of the plastic pipe coupling joint.

FIG. 6 is a side sectional view of yet another embodiment of the plastic pipe coupling joint.

DESCRIPTION OF THE PREFERRED EMBODIMENTS

FIG. 1 shows the end of a pipe section 11 having a plastic ring 12 inserted into the end thereof. Plastic ring 12 has an end face 13 in which are formed a plurality of bores 14. A peripheral flange 16 on plastic ring 12 extends beyond the outside diameter of plastic pipe section 11. A centrally located through bore 17 in plastic ring 12 communicates with the inside diameter of pipe section 11.

FIG. 2 shows plastic ring 12 having a contour 18 extending between front face 13 and the peripheral flange 16. Contour 18 may be seen in FIG. 3 to form a sharp edge around peripheral flange 16 where it meets a rear surface 19 on flange 16. A rear tapered surface 21 exists on plastic ring 12, which is formed to engage a surface shown generally at 22 on the inside diameter of pipe end section 11. Plastic end ring 12 is assembled to the end of pipe section 11 by engaging bores 14 with a suitable tool, and rotating the tool and plastic end ring 12 at a predetermined rotational rate in the direction indicated by arrow 23. Rotation of plastic end ring 12 at the predetermined rate provides tangential velocity at rear tapered surface 21 relative to surface 22 which causes the engaging surfaces to fuse due to the heat of friction. When plastic end ring 12 is forced in the direction shown by arrow 24 while being rotated, plastic end ring 12 is forced into the end of pipe section 11 while surfaces 21 and 22 are being fused. Rotation in the direction of arrow 23 is stopped suddenly, and the fused surfaces allowed to solidify, thereby forming a weld-like bond between surfaces 21 and 22.

Turning now to FIG. 4 one embodiment of the pipe joint is shown in cross section with plastic end rings 12 inserted into the ends of two pipe sections 11 to be joined together. The interference fit between rear tapered surface 21 on the plastic ring 12 and the surface 22 on the inside diameter of pipe section 11 produces the aforementioned heat of friction, fusion, and solidification, but also pushes ahead a bead 26 of melted plastic which is displaced due to the interference between plastic ring 12 and pipe section 11 while surfaces 21 and 22 are in the fused state. While the bond between plastic ring 12 and pipe section 11 need not be fluid impervious, it is substantially so. A flexible sleeve 27 overlies the ends of pipe sections 11 to be joined when the front faces 13 on the peripheral flanges 16 are positioned proximate to one another. A clamp 28 is placed above sleeve 27 overlying the ends of pipe section 11 and the rear tapered surface 21 on plastic end rings 12. Clamp 28 is of the usual kind which provides an adjustable amount of inwardly directed radial force from clamps 28 which is resisted by the radial rigidity provided at the ends of pipe sections 11 by plastic end rings 12. As a consequence a seal is obtained at the interface between the inside diameter of flexible sleeve 27 and the outside diameter of the ends of the pipe sections 11, as well as the line of contact between the sharp edge on the peripheral flange 16 and the inside surface of flexible sleeve 27. As a consequence, if the weld-like bond between surfaces 22 and 21 is not fluid impervious, any leakage is stopped by the seal between the inside surface of flexible sleeve 27 and the outside diameter of the ends of the pipe section 11. A further positive seal is obtained as the sharp edge on peripheral flange 16 "bites" into the inside surface of flexible sleeve 27.

Not only is the integrity of the seal at the pipe joint enhanced by the disclosed structure, due to the double seal line feature provided, but the reliability of the pipe joint is improved due to the substantially permanent radial rigidity afforded to the joint by the plastic end rings 12. Consequently, a less expensive material for pipe section 11 which may have thinner walls may be used. Moreover, the seal provided by the "biting in" of the edge of peripheral flange 16 into the inside surface of flexible sleeve 27 inhibits axial motion in either direction between flexible sleeve 27 and the plastic end rings 12. The sharp peripheral edge on peripheral flange 16 acts as a barb, resisting axial force which tends to separate the joint. On the other hand, front contour 18 facilitates insertion of peripheral flange 16 into flexible sleeve 27 during assembly. Due to the flexibility in flexible sleeve 27, the left hand pipe section 11 in FIG. 4 may have an axis 29 which is slightly misaligned with the axis 31 along the right hand pipe section 11. This misalignment capability compensates for dimensional errors elsewhere in the plumbing system, and may be a lateral displacement or an angular misalignment between axes 29 and 31.

Certain materials have been found to provide excellent results in forming plastic pipe coupling joints having the structural characteristics described above. Polypropylene pipe sections 11 have been found to provide good results with glass-filled polypropylene plastic end rings 12. A relatively high speed is required between surface 22 on pipe section 11 and the rear tapered surface 21 on plastic ring 12, due to the relatively higher heat of fusion characteristic of polypropylene materials. Polyvinylchloride (PVC) has been found to be a desirable material for pipe sections 11 when used with acrylonitrile-butadiene-styrene (ABS) plastic end rings 12. ABS pipe 11 and ABS plastic end rings 12 have also been found to provide desirable joint characteristics. Another combination consists of PVC pipe sections 11 and chlorinated PVC plastic end rings 12. PVC and ABS material require lower rotational speeds due to the lower heat of fusion exhibited by these materials.

The interference fit between any of the above referenced materials ranges between 0.02 to 0.05 inches. Rotational speed for a one inch radius end ring 12 has been found to be satisfactory at 800 rpm. The rotation must be stopped suddenly, within one-half second from 800 rpm to zero speed, due to the rapid solidification in the weld-like joint. Only a small film of the materials are fused, and they therefore solidify quickly when the relative speed between surfaces 21 and 22 is reduced. A slow reduction in speed would result in a fracture of the weld-like joint as the joint solidified during speed reduction. Axial pressure in the direction of arrow 24 in FIG. 3 is required, as mentioned above, to force surfaces 21 and 22 together. It has been found that a 100 pound axial force is convenient, but forces down to 20 pounds in the direction of arrow 24 have been found to be adequate. Tests have shown that the weld-like joints are as strong as the parent materials themselves.

Turning to FIG. 5 an alternate embodiment of the invention may be seen wherein plastic end rings 32 are configured to overly the outside diameter of pipe sections 11 at the ends thereof. A tapered internal surface 33 is formed on rings 32, which is dimensioned to provide an interference fit with the outside diameter of pipe sections 11 as described hereinabove. A peripheral flange 34 is provided on plastic end rings 32 having an outside diameter extending beyond the outside diameter of pipe sections 11. Bores 36 are provided in the front face of plastic rings 32 for engagement by a tool for spinning rings 32 onto the end of pipe section 11. A sharp edge is provided at the periphery of flange 34. Plastic ring 32 is spun and forced axially over the outside diameter of each pipe section 11. As described above the mating surfaces 32 and the outside diameter pipe section 11 are fused due to the heat of friction, and when ring 32 is suddenly stopped, a weld-like bond is obtained as the fused surfaces cool to a solid state. A flexible sleeve 37 overlies the outside surface of plastic ring 32 on each pipe section 11, when the flanges 34 are placed adjacent to one another. A clamp 38 is provided overlying flexible sleeve 37 and surrounding each of the plastic rings 32. Inwardly directed radial force provided by clamp 38 is resisted by the radial rigidity provided at the end of pipe sections 11 by plastic rings 32, to thereby provide a seal between the outside diameter of plastic rings 32 and the inside surfaces of flexible sleeve 37. An additional series positioned seal is provided at the line of contact between the sharp edge on flange 34 and the inner surface of flexible sleeve 37 as the inwardly directed clamping pressure is applied by clamps 38. As mentioned in conjunction with the embodiment of FIG. 4 above, the plastic pipe coupling joint of FIG. 5 provides for lateral and angular misalignment between the respective axes of the pipe sections 11, radial rigidity provided by plastic end rings 32 and subsequent resistance to plastic "creep" and joint leakage, ease of assembly and disassembly, and resistance to joint separation while clamping pressure is applied due to the "biting in" effect of the sharp edge of flange 34 into the inner surface of flexible sleeve 37.

An additional embodiment of the present invention may be found in FIG. 6, where a pair of plastic end rings 39 are formed having a front face 41 with bores 42 therein for engagement by a spin imparting tool. Plastic rings 39 have a rearward extending skirt 43 with an internal tapered surface 44 thereon. Internal tapered surface 44 is dimensioned so as to provide an interference fit with the outside diameter of the ends of pipe section 11. Spinwelding of plastic rings 39 onto the outside diameter of pipe sections 11 is accomplished as described hereinabove. The outer surface of rearwardly extending skirt 43 has at least one circumferential depression such as "V" notch 46. A flexible sleeve 47 overlies the outer surfaces of rearwardly extending skirt 43 when the front faces 41 on the plastic rings 39 are placed proximate to one another. The internal surface of flexible sleeve 47 has spaced continuous protrusions 48 running therearound, having a shape such as to fit within "V" notches 46. Clamps 49 are provided surrounding flexible sleeve 47 overlying the continuous protrusions 48 on the inside surface thereof and the "V" notches 46 on the outer surface of rearwardly extending skirt 43.

It may be seen that when clamps 49 are tightened to produce inwardly directed radial force on flexible sleeve 47, the continuous protrusions 48 spaced on the inner surface of flexible sleeve 47 enter ones of the "V" notches 46, providing a seal line therearound. As many matching protrusions 48 and "V" notches 46 as desired may be provided so that as many series connected seals may be obtained as are necessary for the particular application. The embodiment of FIG. 6 provides structure at the continuous protrusions 48 and "V" notches 46, which inhibits axial motion between flexible sleeve 47 and plastic rings 39, thereby prohibiting joint separation. A high radial rigidity at the ends of pipe sections 11 is provided due to the installation of plastic rings 39. Ease of assembly, disassembly and reassembly is provided as before. Flexible sleeve 47 also allows some lateral and angular misalignment of axes in the joined pipe sections 11.

A plastic pipe coupling joint has been disclosed which does not leak after extended periods of time in operation over a broad temperature range. Low cost, low radial rigidity pipe may be used with a high radial rigidity ring, thereby reducing the overall cost of the plumbing network without reduction on the network integrity.

What is claimed is:

1. A coupling joint engaging two lengths of plastic pipe at surfaces adjacent to the ends thereof, comprising
    a first plastic end ring having a weld surface thereon formed to engage the surface on one pipe with an interference fit to provide radial rigidity to said pipe,
    a second plastic end ring having a weld surface thereon formed to engage the surface on the other pipe with an interference fit to provide radial rigidity to said pipe
    so that when the weld surfaces on said first and second plastic end rings are spun onto their respective pipe surfaces, the ring and pipe surfaces fuse from the heat of friction and upon cooling form a weld joint therebetween, and said end rings provide said additional radial rigidity at the pipe ends,
    a flexible sleeve overlying said first and second plastic end rings to form a seal therewith whereby the axes of the pipe lengths may be misaligned,
    means on the periphery of said first and second plastic end rings for engaging the interior of said flexible sleeve and for inhibiting axial motion thereof relative to the plastic pipe,
    and clamping means overlying said flexible sleeve and said first and second plastic end rings for clamping said flexible sleeve to form a seal, said additional radial rigidity provided by the plastic end rings permitting application of higher clamping forces than would be possible without said end rings.

2. A coupling joint as in claim 1 wherein said weld surface on each ring is internal and has a tapered length thereon, whereby the surface of the rings at the ends of the two lengths of pipe are on the outside thereof, and wherein said means for inhibiting axial motion comprises at least one protruding edge on each of said first and second plastic end rings.

3. A coupling joint as in claim 1 wherein said weld surface on each ring is internal and has a tapered length thereon, whereby the surfaces of the rings adjacent the ends of the two lengths of pipe are on the outside thereof, and wherein said means for inhibiting axial motion comprises at least one surrounding groove on the outside surface of each of said first and second plastic end rings, together with spaced internal ridges extending around the inside surface of said flexible sleeve, one for each of said grooves.

4. A coupling joint as in claim 1 wherein said weld surface on each ring is exterior and has a tapered length thereon, whereby the surfaces of the rings adjacent the ends of the two lengths of pipe are on the inside thereof, and wherein said means for inhibiting axial motion comprises at least one protruding edge surrounding each of said first and second plastic end rings.

5. A pipe coupling joint, comprising
    first and second plastic pipe sections,
    pipe fusion surfaces adjacent to the ends of said first and second pipe sections,
    first and second plastic end rings,
    end ring fusion surfaces on said first and second end rings,
    said pipe and end ring fusion surfaces having similar contours and being sized to provide an interference fit therebetween, so that when one of said first and second end rings is forced axially against one of said first and second pipe sections and rotated one relative to the other at a predetermined rate with said pipe and end ring surfaces in juxtaposition, the friction causes fusion of said surfaces and a welded bond therebetween upon cooling,
    said plastic end rings each having a peripheral edge thereon extending beyond the outside diameter of said pipe sections,
    a flexible sleeve overlying said peripheral edges and the ends of said first and second pipe sections, said peripheral edges operating to inhibit axial movement of said flexible sleeve,
    said first and second end rings providing radial rigidity at the ends of said first and second pipe sections,
    and means for urging said flexible sleeve radially against said peripheral edges, being supported by said radial rigidity, whereby said first and second pipe sections are sealably joined end to end.

6. A coupling joint as in claim 5 wherein said end ring overlies the end of said pipe section.

7. A coupling joint as in claim 5 wherein the end of said pipe section overlies said end ring, whereby said flexible sleeve surrounds said welded bond.

8. A coupling joint as in claim 5 wherein said end ring fusion surface has a tapered length guiding said pipe fusion surface thereon.

9. A joint for plastic pipe, comprising first and second plastic pipe lengths, first and second plastic rings having radial rigidity greater than that of said plastic pipe lengths, a boss on each of said first and second plastic rings having an outside diameter providing an interference fit with the inside diameter at the ends of said first and second plastic pipe lengths respectively, so that when said first and second plastic rings are spun relative to the ends of said first and second plastic pipe lengths and forced axially thereinto, heat generated by friction fuses the mating surfaces thereon and a weld therebetween is obtained after cooling, a flange on each of said first and second plastic rings extending beyond the outside diameters adjacent to the ends of said first and second plastic pipe lengths respectively, a flexible sleeve section overlying the outside diameters of said plastic pipe lengths and said flanges when said flanges are in abutting relation, and means for clamping said flexible sleeve sections surrounding said boss on each plastic ring, whereby a sealed joint is formed between said plastic pipe lengths and misalignment thereof is tolerated.

* * * * *